(12) United States Patent
Mori (10) Patent No.: US 8,958,171 B1
(45) Date of Patent: Feb. 17, 2015

(54) TAPE RECORDING MEDIUM AND DRIVE DEVICE

(71) Applicant: FUJIFILM Corporation, Minato-ku, Tokyo (JP)

(72) Inventor: Yasuhiro Mori, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/520,344

(22) Filed: Oct. 22, 2014

Related U.S. Application Data (63) Continuation of application No. PCT/JP2013/062293, filed on Apr. 25, 2013.

(30) Foreign Application Priority Data

Apr. 26, 2012 (JP) ................. 2012-101442

(51) Int. Cl.
*G11B 5/39* (2006.01)

(52) U.S. Cl.
USPC ........................................... 360/90

(58) Field of Classification Search
USPC ............................................. 360/90
See application file for complete search history.

(56) References Cited

U.S. PATENT DOCUMENTS 6,222,693 B1 * 4/2001 Aoki et al. ................. 360/53

FOREIGN PATENT DOCUMENTS

JP 2004-30889 A 1/2004

* cited by examiner

*Primary Examiner* — Mark Blouin
(74) *Attorney, Agent, or Firm* — Solaris Intellectual Property Group, PLLC (57) ABSTRACT

A tape recording medium includes: a tape member including a recording tape and an exposure tape that is connected to the recording tape and in which an exposure portion for exposing a portion of a head in a tape width direction is formed, the head doing at least one of writing information to and reading information from the recording tape; and a pair of reels to which free ends of the tape member are connected and which retain the tape member such that the pair of reels can pay out and take up the tape member.

17 Claims, 5 Drawing Sheets

TAPE RECORDING MEDIUM AND DRIVE DEVICE

CROSS-REFERENCE TO RELATED APPLICATIONS

This application is a continuation application of International Application No. PCT/JP2013/062293, filed Apr. 25, 2013, the disclosure of which is incorporated herein by reference in its entirety. Further, this application claims priority from Japanese Patent Application No. 2012-101442, filed Apr. 26, 2012, the disclosure of which is incorporated herein by reference in its entirety.

TECHNICAL FIELD

The present invention relates to a tape recording medium and a drive device including the tape recording medium.

BACKGROUND ART

A drive device configured in such a way that it can clean a head for writing information to and/or reading information from recording tape such as magnetic tape has conventionally been known (e.g., see Japanese Patent Application Laid-open (JP-A) No. 2004-30889).

SUMMARY OF INVENTION

Technical Problem

However, in the drive device described in JP-A No. 2004-30889, a traveling path for a shield member for cleaning the head is needed separately from a traveling path for the recording tape, and when cleaning the head, the traveling path of the recording tape ends up being changed by the shield member.

Therefore, it is an object of the present invention to obtain a tape recording medium that makes it possible to clean the head without changing the traveling path of the recording tape and a drive device including the tape recording medium.

Solution to Problem

In order to achieve the above-described object, a tape recording medium of a first aspect pertaining to the present invention includes: a tape member including a recording tape and an exposure tape that is connected to the recording tape and in which an exposure portion for exposing a portion of a head in a width direction is formed, the head doing at least one of writing information to or reading information from the recording tape; and a pair of reels to which free ends of the tape member are connected and which retain the tape member such that the pair of reels can pay out and take up the tape member.

According to the first aspect pertaining to the present invention, the exposure portion that exposes the portion of the head in the tape width direction is formed in the exposure tape connected to the recording tape. Accordingly, the head can be cleaned by positioning the exposure portion on the head. That is, according to the present invention, the head can be cleaned without changing the traveling path of the recording tape.

Furthermore, according to a tape recording medium of a second aspect pertaining to the present invention, in the tape recording medium of the first aspect, the exposure portion may be configured by cutout portions that expose both end portions of the head in the tape width direction.

According to the second aspect pertaining to the present invention, both end portions of the head in the tape width direction can be cleaned.

Furthermore, according to a tape recording medium of a third aspect pertaining to the present invention, in the tape recording medium of the first aspect, the exposure portion may be configured by an open portion that exposes a central portion of the head in the tape width direction.

According to the third aspect pertaining to the present invention, the central portion of the head in the tape width direction can be cleaned.

Furthermore, according to a tape recording medium of a fourth aspect pertaining to the present invention, in the tape recording medium of the first aspect, the exposure portion may be configured by cutout portions that expose both end portions of the head in the tape width direction and an open portion that is formed out of alignment with the cutout portions in a tape lengthwise direction and exposes a central portion of the head in the tape width direction.

According to the fourth aspect pertaining to the present invention, the entire surface of the head in the tape width direction can be cleaned.

Furthermore, according to a tape recording medium of a fifth aspect pertaining to the present invention, in the tape recording medium of any of the first to fourth aspects, the exposure tape may be formed thicker than the recording tape.

According to the fifth aspect pertaining to the present invention, when cleaning the head with a cleaning member, there is no concern that the exposure tape will break even when the cleaning member contacts the exposure tape.

Furthermore, according to a tape recording medium of a sixth aspect pertaining to the present invention, in the tape recording medium of any of the first to fifth aspects, the exposure tape may be configured by a material having a higher elastic modulus than the recording tape.

According to the sixth aspect pertaining to the present invention, when cleaning the head with a cleaning member, there is no concern that the exposure tape will break even when the cleaning member contacts the exposure tape.

Furthermore, according to a tape recording medium of a seventh aspect pertaining to the present invention, in the tape recording medium of any of the first to sixth aspects, the recording tape may be connected to both ends of the exposure tape.

According to the seventh aspect pertaining to the present invention, the distance traveled by the recording tape until the exposure portion of the exposure tape is positioned on the head can be shortened.

Furthermore, according to a tape recording medium of an eighth aspect pertaining to the present invention, in the tape recording medium of any of the first to seventh aspects, a protective tape may be connected between the exposure tape and the recording tape.

According to the eighth aspect pertaining to the present invention, the shape of the exposure portion of the exposure tape can be kept or prevented by the protective tape from being transferred to the recording tape.

Furthermore, a drive device of a ninth aspect pertaining to the present invention includes: the tape recording medium according to any of the first to eighth aspects, which is non-removably built into a device body; the head that does at least one of writing information to or reading information from the recording tape while contacting the recording tape that travels; and a cleaning member that cleans the head in a state in which the exposure portion is exposing the portion of the head in the tape width direction.

According to the ninth aspect pertaining to the present invention, the head can be cleaned without changing the traveling path of the recording tape in the drive device into which the pair of reels are non-removably built.

Furthermore, according to a drive device of a tenth aspect pertaining to the present invention, in the drive device of the ninth aspect, the cleaning member may move in the tape width direction and cleans the head.

According to the tenth aspect pertaining to the present invention, a small space suffices for installing the cleaning member.

Advantageous Effects of Invention

As described above, according to the present invention, the head can be cleaned without changing the traveling path of the recording tape.

DESCRIPTION OF EMBODIMENT

An embodiment pertaining to the present invention will be described in detail below on the basis of the drawings. For convenience of description, arrow UP in FIG. 1 indicates an upward direction, arrow DO indicates a downward direction, and a rotational axis direction of reels 10 and 20 pertaining to the present embodiment is made coincident with the up and down direction (height direction). Furthermore, first an overview of a drive device 50 in which a tape recording medium 30 including the reels 10 and 20 is non-removably disposed will be described, and then the configuration of the tape recording medium 30 will be described in detail.

<Overview of Drive Device>

Figure 1:
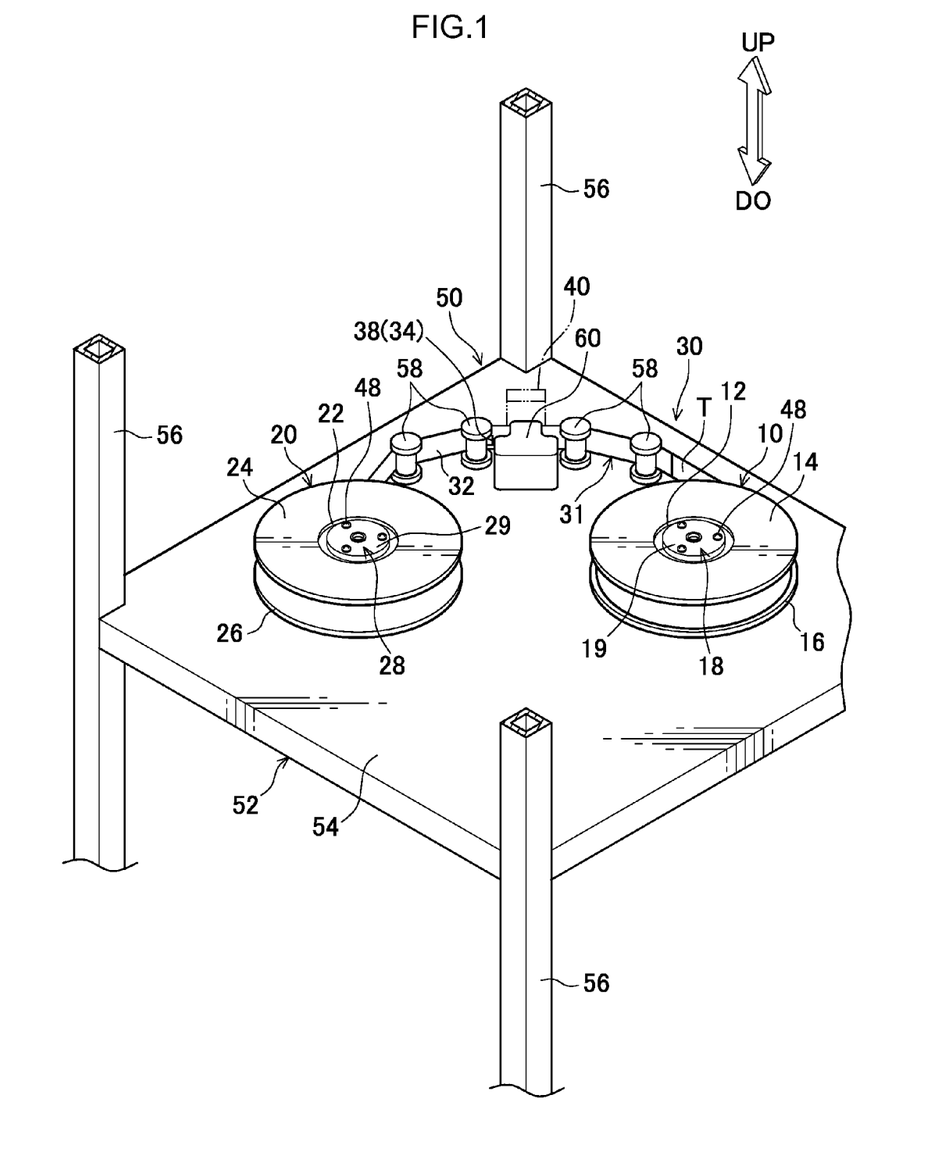
FIG. 1 is a perspective view showing a tape recording medium non-removably built into a drive device.

The reels 10 and 20 pertaining to the present embodiment are made of a synthetic resin material such as polycarbonate (PC), for example, and molded in the same shape. Additionally, as shown in FIG. 1, the reels 10 and 20 are disposed as a pair inside a casing 52 (in FIG. 1, only a bottom plate 54 and three struts 56 are shown) serving as a device body of the drive device 50.

The reel 10 is for paying out recording tape (magnetic tape) T serving as an information recording and playback medium, the reel 20 is for taking up the recording tape T, and the recording tape T that is paid out from the reel 10 and travels makes sliding contact with, while being taken up onto the reel 20, a head 60 that does at least one of record (write) data (information) to and play back (read) data (information) from the recording tape T.

On the bottom plate 54 on both sides of the head 60, plural (those shown in the drawing include two on each side for a total of four) tape guides 58 are disposed in such a way that they may freely rotate, and the recording tape T pulled out from the reel 10 and taken up onto the reel 20 is guided by the tape guides 58.

Furthermore, the reels 10 and 20 are configured to include: substantially cylindrical reel hubs 12 and 22 that includes, on their rotational center sides, short cylinder-like axial center portions 18 and 28 having top plates 19 and 29; annular upper flanges 14 and 24 serving as first flanges that are disposed on upper end portion sides of the reel hubs 12 and 22; and annular lower flanges 16 and 26 serving as second flanges that are disposed on lower end portion sides of the reel hubs 12 and 22.

Additionally, the recording tape T is wound around the outer peripheral surface of the reel hub 12 of the reel 10, and end portions (edge portions) of the wound recording tape T in the width direction are retained by the upper flange 14 and the lower flange 16. Furthermore, the recording tape T paid out from the reel 10 is wound around the outer peripheral surface of the reel hub 22 of the reel 20, and the end portions (edge portions) of the recording tape T in the width direction are retained by the upper flange 24 and the lower flange 26.

"Substantially cylindrical" in the present embodiment also includes: having a generally solid cylindrical shape, in which the shapes of the outer peripheral surfaces (winding surfaces) of the reel hubs 12 and 22 around which the recording tape T is wound are formed in the shape of a drum or the like; having a hollow shape that is not completely cylindrical, in which ribs or the like are projectingly disposed on the inner peripheral surface sides of the reel hubs 12 and 22; and so on.

Furthermore, a motor (not shown in the drawings) serving as a drive source is disposed in the drive device 50, and a pair of rotation transmitting members (not shown in the drawings) to which rotational driving force is transmitted from a rotating shaft (not shown in the drawings) of the motor are rotatably disposed inside a pair of open portions (not shown in the drawings) formed in the casing 52 (the bottom plate 54) of the drive device 50.

Additionally, screw hole portions (not shown in the drawings) are formed in a circumferential direction in the axial center portions 18 and 28 of the reels 10 and 20, and the reels 10 and 20 are integrally fastened and fixed to the rotation transmitting members by inserting screws 48 through the screw hole portions and screwing the screws 48 into the rotation transmitting members. Because of this, the reels 10 and 20 have a configuration where they are non-removably built into the casing 52 of the drive device 50.

<Configuration of Tape Recording Medium>

Next, the configuration of the tape recording medium 30, in which a tape member 31, which includes the recording tape T and the exposure tape 32 that is connected to a free end of the recording tape T and used when cleaning the head 60, is entrained between the reel 10 and the reel 20, will be described in detail.

As shown in FIG. 1 to FIGS. 3A and 3B, the tape recording medium 30 has the tape member 31, which has one free end connected to the reel hub 12 of the reel 10 and the other free end connected to the reel hub 22 of the reel 20. The tape member 31 is configured to include the recording tape T, and one free end of the recording tape T is connected to and wound around the reel hub 12 of the reel 10.

Furthermore, the tape member 31 is configured to include the exposure tape 32, which is integrally (so as to travel the same path) connected via splice tape 33 (see FIG. 4 and FIG. 5) to the other free end of the recording tape T, and the free end of the exposure tape is connected to the reel hub 22 of the reel 20. Additionally, an exposure portion 34 for exposing a portion of the head 60 in the tape width direction while contacting the head 60 is formed in an intermediate portion of the exposure tape 32.

Specifically, the exposure portion 34 is configured to include cutout portions 36 that expose both end portions of the head 60 in the tape width direction and an open portion 38 that exposes a central portion of the head 60 in the tape width direction, and the cutout portions 36 and the open portion 38 are formed in the exposure tape 32 adjacent to (out of alignment with) one another in the tape lengthwise direction.

In other words, the exposure tape 32 is configured in a shape where a central connecting portion 32A, which contacts the central portion of the head 60 in the tape width direction exposed by the open portion 38 and covers that central portion so as to not expose it, and dual end connecting portions 32B, which contact both end portions of the head 60 in the tape width direction exposed by the cutout portions 36 and cover both of those end portions so as to not expose them, are formed adjacent to (out of alignment with) one another in the tape lengthwise direction.

The exposure tape 32 preferably has greater stiffness than the recording tape T. That is, the exposure tape 32 is formed of a material (e.g., PET, PEN, or aramid resin material) having a higher elastic modulus than the recording tape T or is formed thicker than the recording tape T, so that the exposure tape 32 is configured to have greater durability (strength) than the recording tape T. Because of this, there is no concern that the central connecting portion 32A and the dual end connecting portions 32B will wear and break even when a later-described brush 40 (a raised bristle portion 44) makes sliding contact with the central connecting portion 32A and the dual end connecting portions 32B.

In the case of using exposure tape 32 that is thicker than the recording tape T, the one end (free end) of the exposure tape 32 connected to the recording tape T may be tapered so that it gradually decreases in thickness toward the recording tape T. According to this, the joint between the exposure tape 32 and the recording tape T resulting from the splice tape 33 becomes reliable, and there is no pronounced difference in height at the joint portion between the exposure tape 32 and the recording tape T, so stable travel becomes possible. Furthermore, a layer having a lubricating function may also be disposed on the surface of the exposure tape 32. Because of this, stable travel becomes possible.

A brush 40 serving as a cleaning member that wipes and cleans the head 60 is disposed in the drive device. The brush 40 is configured to include a rectangular block-like body portion 42 whose lengthwise direction is made coincident with the tape width direction, a raised bristle portion 44 including numerous, relatively soft, resin bristles that do not damage a surface 60A of the head 60 and are implanted in a wall surface of the body portion 42 opposing the head 60 (the surface 60A), and a columnar support portion 46 that is fixed to the lower portion of the body portion 42, and the width of the raised bristle portion 44 (its length in the tape traveling direction) is equal to or greater than the width of the surface 60A of the head 60 (its length in the tape traveling direction).

Additionally, the raised bristle portion 44 of the brush 40 is configured in such a way that it can be brought into contact with and separated from the surface 60A of the head 60. That is, the support portion 46 of the brush 40 is configured in such a way that it can be moved, by a non-illustrated and known moving mechanism such as a solenoid or a rack and pinion, between a separated position in which the raised bristle portion 44 is not in contact with the surface 60A of the head 60 and a contact position in which the raised bristle portion 44 is in contact with the surface 60A of the head 60.

Additionally, the support portion 46 of the brush 40 is configured in such a way that, in the contact position in which the raised bristle portion 44 is in contact with the surface 60A of the head 60, it can be reciprocally moved in the tape width direction at a speed at which it does not damage the surface 60A of the head 60 by a non-illustrated and known raising and lowering mechanism such as a rack and pinion. Because of this, the raised bristle portion 44 can wipe the portion(s) of the head 60 in the tape width direction exposed by the cutout portions 36 or the open portion 38.

<Action of Tape Recording Medium>

Next, the action of the tape recording medium 30 including the tape member 31 and having the above-described configuration will be described.

The positions of the central connecting portion 32A (the cutout portions 36) and the dual end connecting portions 32B (the open portion 38) in the exposure tape 32 of the tape member 31 are stored beforehand in a non-illustrated control unit of the drive device 50. Accordingly, when a user operates a non-illustrated console of the drive device 50 to execute cleaning of the head 60, the reel 10 and the reel 20 synchronously rotate a predetermined amount so that the cutout portions 36 or the open portion 38 in the exposure tape 32 are/is disposed on the surface 60A of the head 60.

Figure 2A:
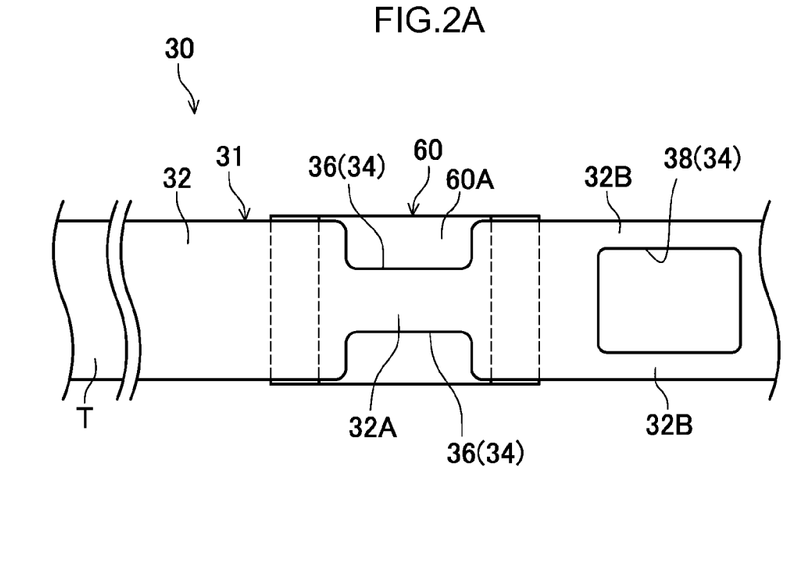
FIG. 2A is a front view showing a case of cleaning both end portions of a head in a tape width direction.
Figure 2B:
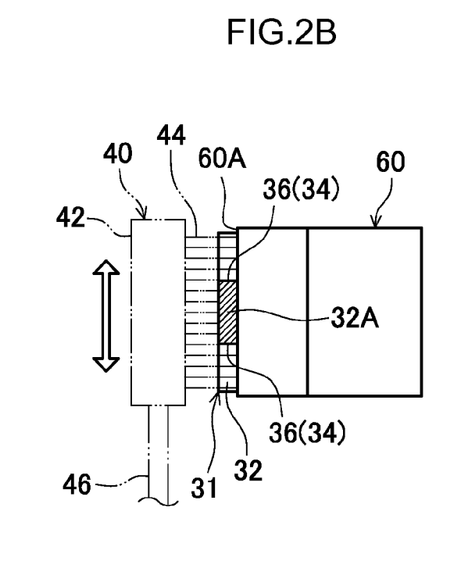
FIG. 2B is a side view showing the case of cleaning both end portions of the head in the tape width direction.

For example, in the case of cleaning both end portions of the head 60 in the tape width direction first, the above-described operation causes the reel 10 and the reel 20 to synchronously rotate a predetermined amount so that, as shown in FIG. 2A, the central connecting portion 32A—that is, the cutout portions 36—of the exposure tape 32 is disposed on the surface 60A of the head 60. Then, the moving mechanism moves the brush 40 (the support portion 46) toward the head 60 so that, as shown in FIG. 2B, the raised bristle portion 44 contacts the surface 60A of the head 60 (and the central connecting portion 32A).

Then, the raising and lowering mechanism reciprocally moves the brush 40 (the support portion 46) a predetermined number of times in the up and down direction so that the raised bristle portion 44 wipes both end portions of the head 60 in the tape width direction exposed by the cutout portions 36. Because of this, both end portions of the head 60 in the tape width direction are cleaned. When the act of cleaning both end portions of the head 60 in the tape width direction ends, the moving mechanism moves the brush 40 (the support portion 46) in a direction away from the head 60.

Figure 3A:
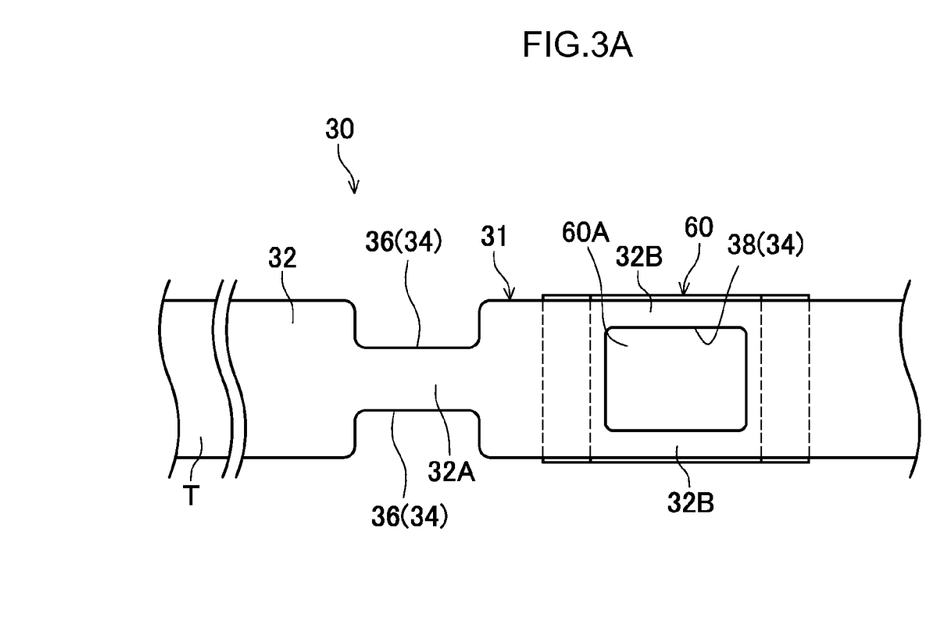
FIG. 3A is a front view showing a case of cleaning a central portion of the head in the tape width direction.
Figure 3B:
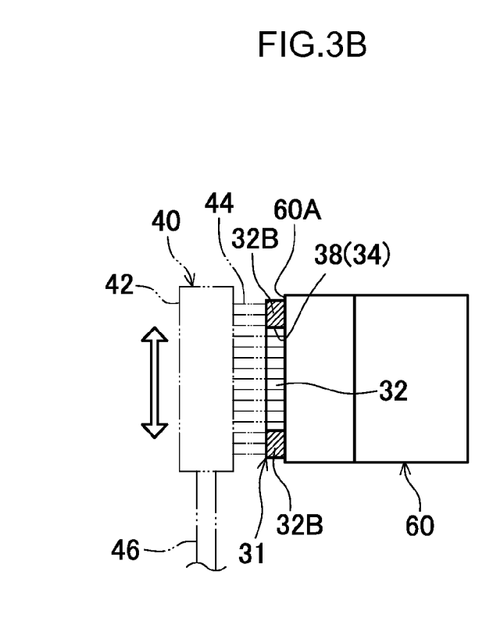
FIG. 3B is a side view showing the case of cleaning the central portion of the head in the tape width direction.

Next, in the case of cleaning the central portion of the head 60 in the tape width direction, the reel 10 and the reel 20 synchronously (and reversely) rotate a predetermined amount so that, as shown in FIG. 3A, the dual end connecting portions 32B—that is, the open portion 38—of the exposure tape 32 are disposed on the surface 60A of the head 60. Then, the moving mechanism moves the brush 40 (the support portion 46) toward the head 60 so that, as shown in FIG. 3B, the raised bristle portion 44 contacts the surface 60A of the head 60 (and the dual end connecting portions 32B).

Then, the raising and lowering mechanism reciprocally moves the brush 40 (the support portion 46) a predetermined number of times in the up and down direction so that the raised bristle portion 44 wipes the central portion of the head 60 in the tape width direction exposed by the open portion 38. Because of this, the central portion of the head 60 in the tape width direction is cleaned. When the act of cleaning the central portion of the head 60 in the tape width direction ends, the moving mechanism moves the brush 40 (the support portion 46) in a direction away from the head 60.

The cleaning of the head 60 is completed by the acts described above, but the control of the cleaning of the head 60 is not limited to a configuration where both end portions in the tape width direction and the central portion of the head 60 (the entire surface 60A) in the tape width direction are cleaned each time. For example, the invention may also be given a configuration where just the sections of the surface 60A of the head 60 to which dirt easily sticks due to the edge portions of the recording tape T—that is, both tape end portions of the surface 60A of the head 60 in the tape width direction—can be selected and cleaned.

Furthermore, the exposure tape 32 in which is formed the exposure portion 34 (the cutout portions 36 and the open portion 38) is integrally connected to the recording tape T, so there is no need to dispose a traveling path for the exposure tape 32 in addition to the traveling path for the recording tape T. Accordingly, the head 60 can be cleaned without changing the traveling path of the tape member 31 (the recording tape T) in the drive device 50 in which the reels 10 and 20 are non-removably built and in which the tape member 31 (the recording tape T) is always in contact with the head 60.

Furthermore, the central connecting portion 32A or the dual end connecting portions 32B of the exposure tape 32 make sliding contact with the raised bristle portion 44 together with the head 60, but the exposure tape 32 has greater stiffness than the recording tape T. That is, the exposure tape 32 is formed of a material having a higher elastic modulus than the recording tape T or is formed thicker than the recording tape T.

Accordingly, there is no concern that the central connecting portion 32A and the dual end connecting portions 32B of the exposure tape 32 will wear and break even when the raised bristle portion 44 makes sliding contact with the central connecting portion 32A and the dual end connecting portions 32B. Furthermore, the phenomenon where just the central connecting portion 32A or the dual end connecting portions 32B at which the tape width is small end up stretching when the same tension as the recording tape T is applied to them can also be kept in check.

Figure 4:
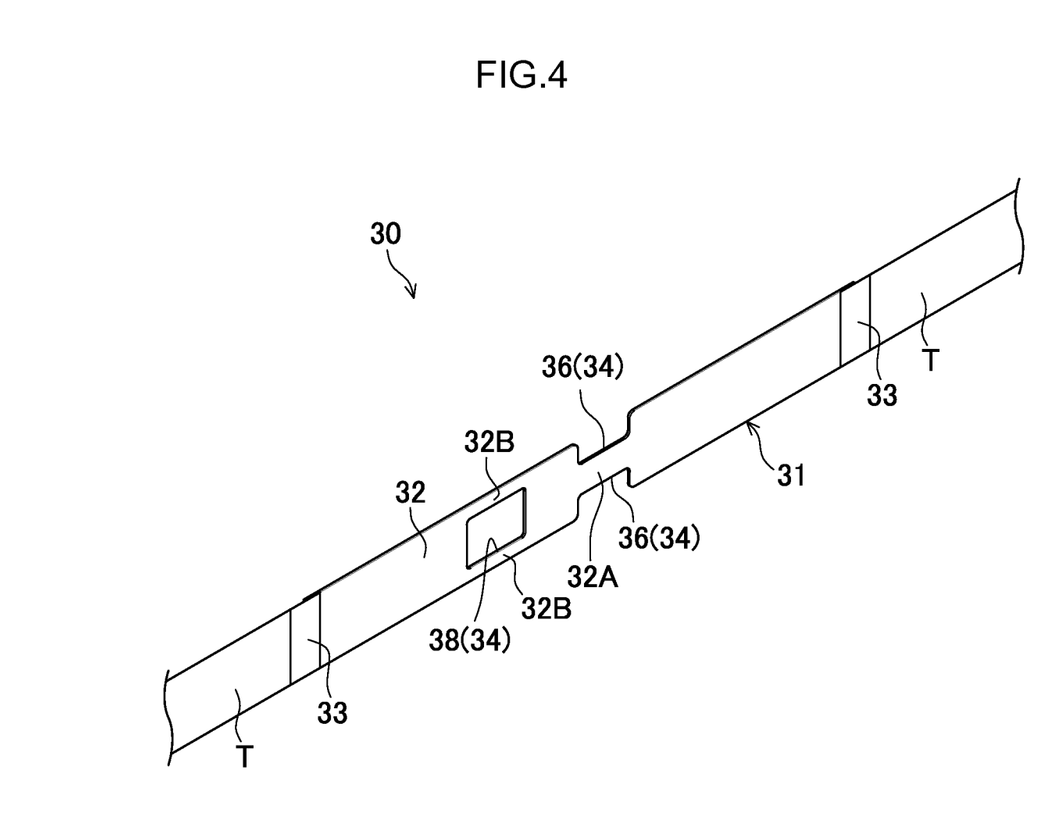
FIG. 4 is a perspective view showing a tape member in which exposure tape is connected between recording tape and recording tape.

Furthermore, the invention is not limited to a configuration where the free end of the exposure tape 32 is connected to the reel hub 22 of the reel 20. That is, as shown in FIG. 4, the invention may also be given a configuration where the exposure tape 32 is connected between recording tape T and recording tape T (where the recording tape T is connected to both ends of the exposure tape 32). According to this, the average value of the distance traveled by the tape member 31 (the recording tape T) until the exposure portion 34 of the exposure tape 32 is positioned on the head 60 can be shortened compared to a configuration where the free end of the exposure tape 32 is connected to the reel hub 22.

For example, in a case where the exposure tape 32 is connected to the central section of the tape member 31 and most of the tape member 31 is wound around the reel 20, the distance traveled by the tape member 31 (the recording tape T) (the length of the tape member 31 (the recording tape T) rewound onto the reel 10) until the exposure portion 34 of the exposure tape 32 is positioned on the head 60 is substantially half of what it is in a configuration where the free end of the exposure tape 32 is connected to the reel hub 22 of the reel 20.

Figure 5:
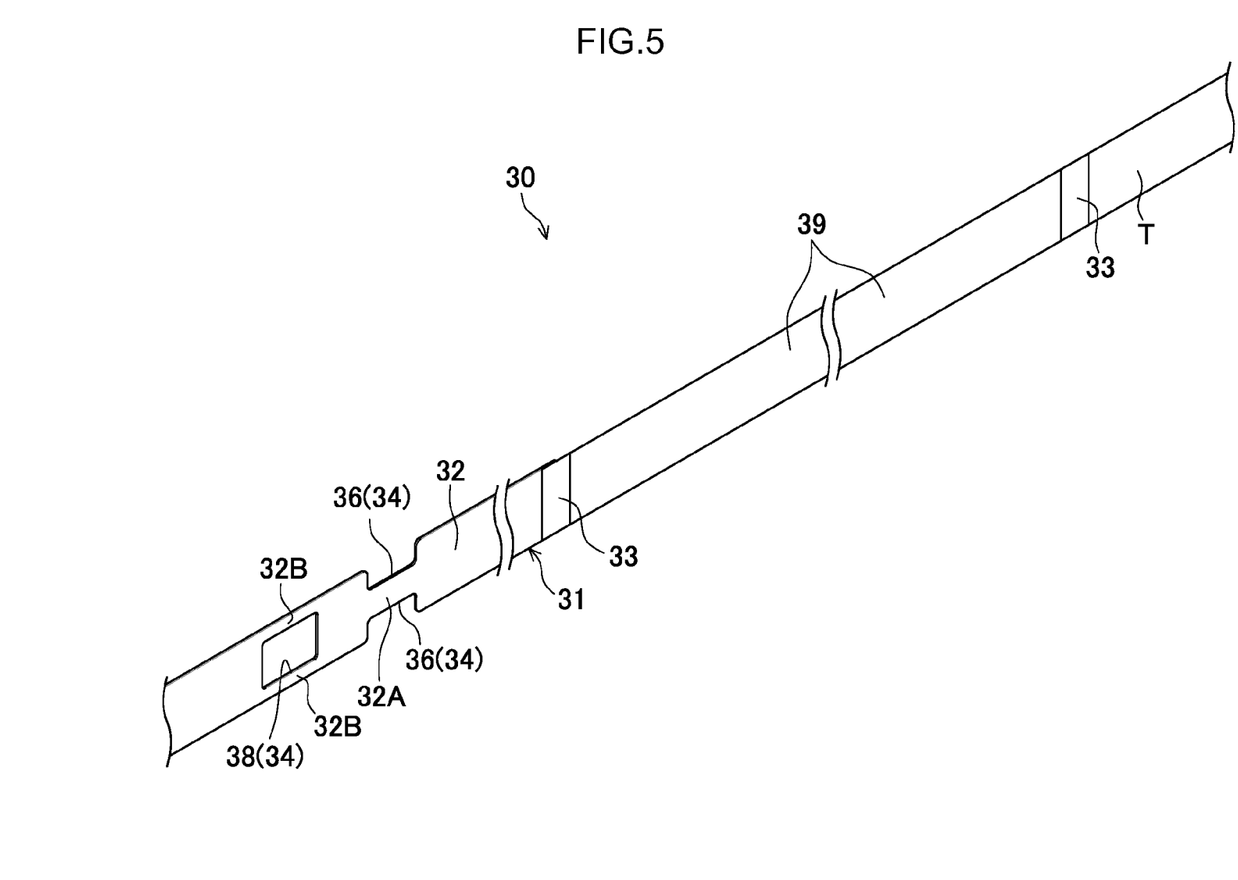
FIG. 5 is a perspective view showing a tape member in which protective tape is connected between recording tape and exposure tape.

Furthermore, as shown in FIG. 5, the invention may also be given a configuration where protective tape 39 is connected between the exposure tape 32 and the recording tape T. According to this, the shape of the exposure portion 34 (the cutout portions 36 and the open portion 38) of the exposure tape 32 can be kept or prevented by the protective tape 39 from being transferred to the recording tape T when the exposure tape 32 is wound around the reel 10 or the reel 20.

As the protective tape 39, tape configured by the same material as the recording tape T, for example, can be employed. Furthermore, it goes without saying that the length of the protective tape 39 is a length sufficient enough to be able to keep or prevent the shape of the exposure portion 34 from being transferred to the recording tape T when the exposure tape 32 is wound around the reel 10 or the reel 20.

In addition, the brush 40, which configures a head cleaning device together with the exposure tape 32, has a configuration where it moves in the tape width direction and wipes the surface 60A of the head 60. For that reason, there is the advantage that a small space for installing the brush 40 in the drive device 50 suffices.

The tape recording medium 30 and the drive device 50 pertaining to the present embodiment have been described above on the basis of the drawings, but the tape recording medium 30 and the drive device 50 pertaining to the present embodiment are not limited to what is illustrated in the drawings and can undergo appropriate design changes without departing from the spirit of the present invention. For example, the invention may also have a configuration where the free end of the exposure tape 32 is connected to the reel hub 12 of the reel 10.

Furthermore, the cutout portions 36 formed in the exposure tape 32 are not limited to being formed in positions opposing one another in the tape width direction and may also be formed out of alignment with one another in the tape lengthwise direction. That is, as the exposure portion 34 formed in the exposure tape 32, a cutout portion 36 that exposes one end portion of the head 60 in the tape width direction, an open portion 38 that exposes the central portion of the head 60 in the tape width direction, and a cutout portion 36 that exposes the other end portion of the head 60 in the tape width direction may also be formed in the exposure tape 32 adjacent to one another in the tape lengthwise direction.

Furthermore, the invention may also be configured in such a way that the exposure tape 32 is tape configured by the same material as the recording tape T and the exposure portion 34 (the cutout portions 36 and the open portion 38) is formed in part of that tape so that the head 60 can be cleaned as described above. Moreover, the cleaning member is not limited to the brush 40 and may also be nonwoven fabric, for example. Furthermore, the cleaning member (the brush 40) may also be configured in such a way that it can be replaced.

What is claimed is:

1. A tape recording medium comprising:
   a tape member including a recording tape and an exposure tape that is connected to the recording tape and in which an exposure portion for exposing a portion of a head in a tape width direction is formed, the head doing at least one of writing information to or reading information from the recording tape; and
   a pair of reels to which free ends of the tape member are connected and which retain the tape member such that the pair of reels can pay out and take up the tape member.

2. The tape recording medium according to claim 1, wherein the exposure portion is configured by cutout portions that expose both end portions of the head in the tape width direction.

3. The tape recording medium according to claim 1, wherein the exposure portion is configured by an open portion that exposes a central portion of the head in the tape width direction.

4. The tape recording medium according to claim 1, wherein the exposure portion is configured by cutout portions that expose both end portions of the head in the tape width direction, and an open portion that is formed out of alignment with the cutout portions in a tape lengthwise direction and exposes a central portion of the head in the tape width direction.

5. The tape recording medium according to claim 1, wherein the exposure tape is formed thicker than the recording tape.

6. The tape recording medium according to claim 1, wherein the exposure tape is configured by a material having a higher elastic modulus than the recording tape.

7. The tape recording medium according to claim 1, wherein the recording tape is connected to both ends of the exposure tape.

8. The tape recording medium according to claim 1, wherein a protective tape is connected between the exposure tape and the recording tape.

9. A drive device comprising:
   the tape recording medium according to claim 1, which is non-removably built into a device body;
   the head that does at least one of writing information to or reading information from the recording tape while contacting the recording tape that travels; and
   a cleaning member that cleans the head in a state in which the exposure portion is exposing the portion of the head in the tape width direction.

10. The drive device according to claim 9, wherein the cleaning member moves in the tape width direction and cleans the head.

11. The drive device according to claim 9, wherein the exposure portion is configured by cutout portions that expose both end portions of the head in the tape width direction.

12. The drive device according to claim 9, wherein the exposure portion is configured by an open portion that exposes a central portion of the head in the tape width direction.

13. The drive device according to claim 9, wherein the exposure portion is configured by cutout portions that expose both end portions of the head in the tape width direction, and an open portion that is formed out of alignment with the cutout portions in a tape lengthwise direction and exposes a central portion of the head in the tape width direction.

14. The drive device according to claim 9, wherein the exposure tape is formed thicker than the recording tape.

15. The drive device according to claim 9, wherein the exposure tape is configured by a material having a higher elastic modulus than the recording tape.

16. The drive device according to claim 9, wherein the recording tape is connected to both ends of the exposure tape.

17. The drive device according to claim 9, wherein a protective tape is connected between the exposure tape and the recording tape.

\* \* \* \* \*